United States Patent

Britton

Patent Number: 5,474,316
Date of Patent: Dec. 12, 1995

[54] FOLDING TRAILER

[75] Inventor: Daniel W. Britton, Calgary, Canada

[73] Assignee: 634182 Alberta Ltd., Calgary, Canada

[21] Appl. No.: 107,877

[22] Filed: Aug. 18, 1993

[51] Int. Cl.$^6$ ........................................... B62B 3/02
[52] U.S. Cl. .................................. 280/204; 280/656
[58] Field of Search .................... 280/204, 30, 63, 280/292, 639, 35, 647, 648, 650, 651, 652, 656, 14

[56] References Cited

U.S. PATENT DOCUMENTS

| | | | |
|---|---|---|---|
| D. 297,525 | 9/1988 | Baechler | D12/129 |
| 3,083,050 | 3/1963 | Gill | 297/16 |
| 3,271,048 | 9/1966 | Beesley et al. | 280/204 |
| 3,276,545 | 10/1966 | D'Angelo | 182/153 |
| 3,312,299 | 4/1967 | Kuecker | 280/204 X |
| 3,442,268 | 5/1969 | Symes | 280/14 X |
| 3,857,604 | 12/1974 | Scott | 297/16 |
| 4,057,283 | 11/1977 | Barnett | 280/204 X |
| 4,249,636 | 2/1981 | Jackson et al. | 182/152 |
| 4,721,320 | 1/1988 | Creps et al. | 280/204 |
| 4,951,782 | 8/1990 | Hanson | 182/153 |
| 5,020,814 | 6/1991 | George et al. | 280/204 |
| 5,242,178 | 9/1993 | Galasso et al. | 280/292 X |
| 5,259,634 | 11/1993 | Berner et al. | 280/204 |
| 5,301,963 | 4/1994 | Chen | 280/204 X |
| 5,318,318 | 6/1994 | Berner et al. | 280/204 |

FOREIGN PATENT DOCUMENTS

| | | | |
|---|---|---|---|
| 461812 | 12/1949 | Canada. | |
| 675929 | 12/1963 | Canada | 155/43 |
| 1102861 | 6/1981 | Canada | 311/27 |
| 1230145 | 12/1987 | Canada. | |

OTHER PUBLICATIONS

ORBY Brochure date: not known.
Winchester Originals—Owner's Manual date: not known.
CycleTote Brochure date: not known.
Burley Brochure date: not known.

*Primary Examiner*—Margaret A. Focarino
*Assistant Examiner*—Kevin Hurley
*Attorney, Agent, or Firm*—Bennett Jones Verchere

[57] ABSTRACT

A trailer, as for example for towing behind a bicycle, has an upper frame member, a lower frame member and a pair of folding frame units. The trailer may be folded into compact position by collapsing the folding frame units allowing the rotation of the upper frame member toward the lower frame member. The trailer is easy to manufacture and offers a simplified folding procedure over previously known trailers. The trailer may be modified for use as a stroller.

16 Claims, 4 Drawing Sheets

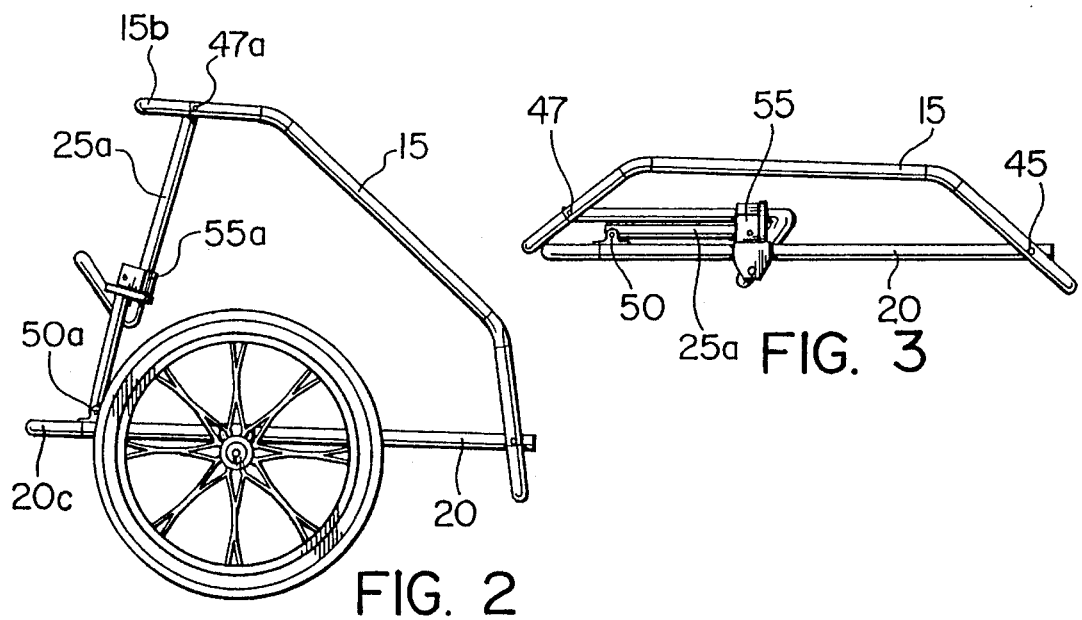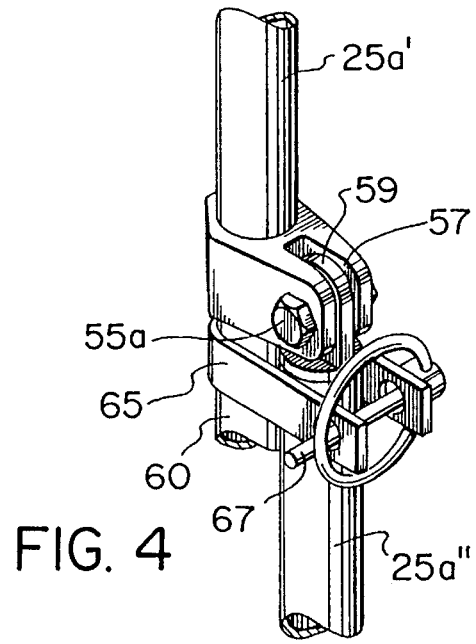

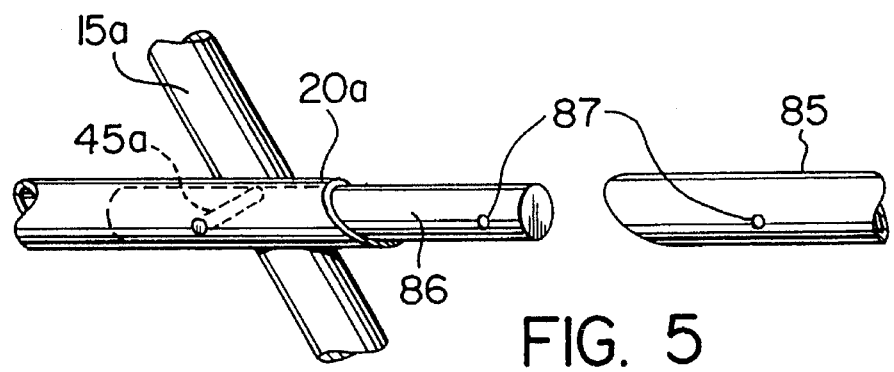
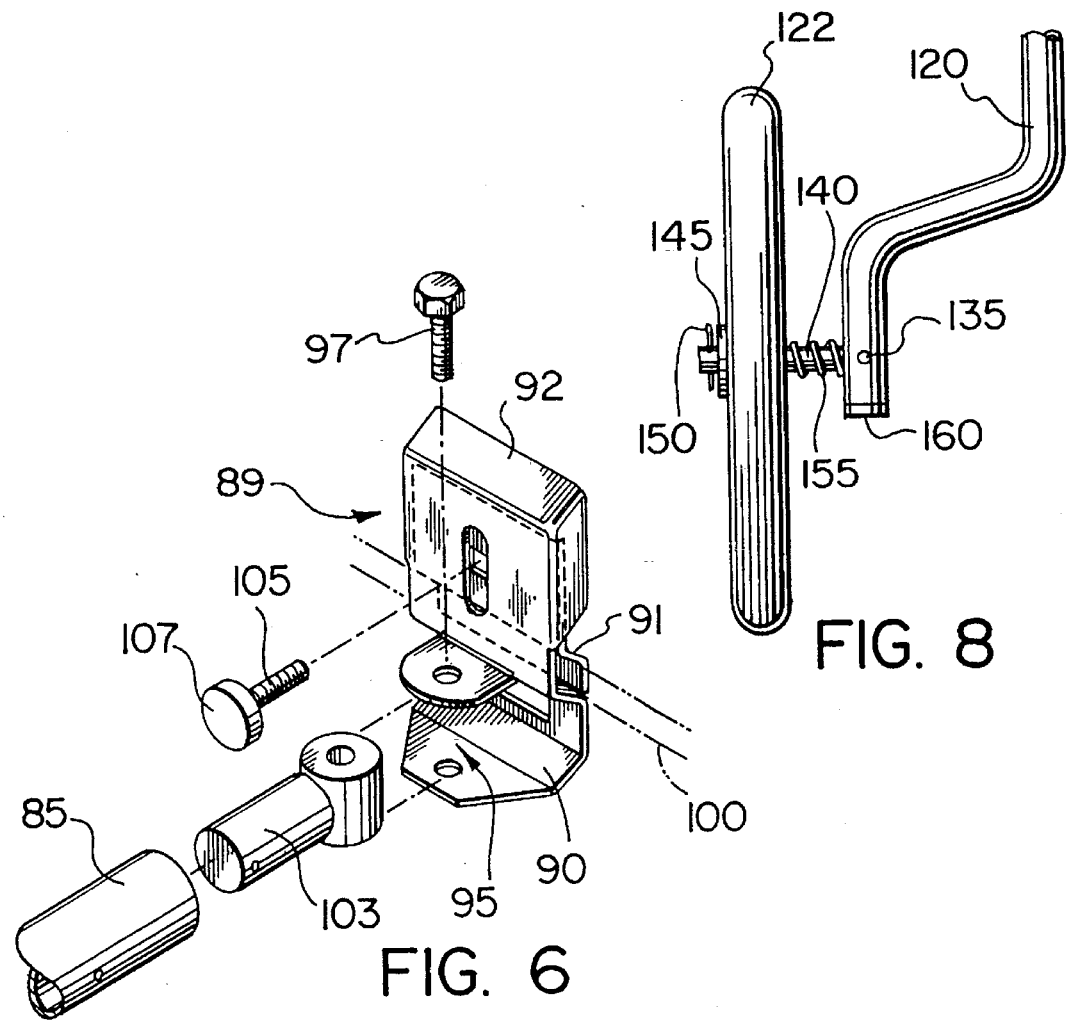

5,474,316

FOLDING TRAILER

FIELD OF THE INVENTION

The present invention is directed toward folding trailers and, in particular, toward folding trailers adapted to be towed behind a bicycle or the like.

BACKGROUND OF THE INVENTION

Trailers for use with bicycles are well known in the art. Such trailers are useful for carrying small children or for transporting goods. As is taught in Canadian Patent Application 2,084,101 of Britton filed Nov. 30, 1992, the trailers must offer durability and safety while being small and easily stored. Some trailers fold into compact size for storage but often these trailers are complex to manufacture which increases the cost to the consumer. In addition, collapsing the trailer into the compact position is often labour intensive and time consuming.

A folding trailer has been developed which is easy to manufacture, thereby reducing costs, and offers a simplified collapsing procedure with few separate parts.

SUMMARY OF THE INVENTION

According to a broad aspect of the present invention there is provided a folding trailer comprising:

an upper, continuous frame member having a forward end and a rear end and defining an upper limit of a cargo compartment;

a lower frame member, substantially U-shaped in plan view, defining a lower limit of a cargo compartment and having a pair of arms extending from a rear end, the arms being pivotally connected to the upper frame member adjacent its forward end; and, a pair of folding frame units, each folding frame unit having a first end and a second end, the first end of each folding frame unit being pivotally connected adjacent the rear end of the upper portion and the opposite end of each folding frame unit being pivotally connected adjacent the rear end of the lower frame member, each folding frame unit having a pivot point such that the folding frame unit is foldable from an extended position to a collapsed position allowing the upper frame member to rotate towards the lower frame member and thereby fold the trailer into a compact position; and, a displacement means.

According to a further aspect of the present invention there is provided a folding trailer adapted for towing by a bicycle comprising:

an upper, continuous frame member having a forward end and a rear end and defining the upper limit of a cargo compartment;

a lower frame member, substantially U-shaped in plan view, defining a lower limit of a cargo compartment and having a pair of arms extending from a rear end, the arms being pivotally connected to the upper frame member adjacent its forward end; and, a pair of folding frame units, each folding frame unit having a first end and a second end, the first end of each folding frame unit being pivotally connected adjacent the rear end of the upper portion and the opposite end of each folding frame unit being pivotally connected adjacent the rear end of the lower frame member, each folding frame unit having a pivot point such that the folding frame unit is foldable from an extended position to a collapsed position allowing the upper frame member to rotate towards the lower frame member and thereby fold the trailer into a compact position;

a hitch arm and a hitch member for attachment to the bicycle extending forwardly of the lower frame member; and, a plurality of wheels for supporting the frame.

According to a still further aspect of the present invention, there is provided a folding stroller comprising:

an upper, continuous frame member having a forward end and a rear end and defining an upper portion of a cargo compartment;

a lower frame member, substantially U-shaped in plan view, defining a lower portion of the cargo compartment and having a pair of arms extending forwardly from a rear end, the arms being pivotally connected at their forward portions to the upper frame member adjacent its forward end; and, a pair of folding frame units, each folding frame unit having a first end and a second end, the first end of each folding frame unit being pivotally connected to the upper frame member adjacent the rear end thereof and the opposite end of each folding frame unit being pivotally connected to the lower frame member adjacent the rear end thereof, each folding frame unit having two members pivotally connected such that the folding frame unit is foldable from an extended position to a collapsed position in which the upper frame member rotates towards the lower frame member and thereby folds the stroller into a compact position;

a pair of wheels for supporting the stroller;

a wheel arm extending forwardly of the lower frame member and a wheel supported on the wheel arm; and, a handle for pushing the stroller.

BRIEF DESCRIPTION OF THE DRAWINGS

For a better understanding of the present invention, reference may be made by way of example to the following diagrammatic drawings in which:

FIG. 2 is a side view of the trailer of FIG. 1 in the operative position with the hitch removed;

FIG. 3 is a side view of the trailer of FIG. 1 in the folded compact position with the wheels and hitch removed;

FIG. 4 is a perspective view of the pivot point of the folding frame units of FIG. 1;

FIG. 5 is a perspective view of the attachment site of the hitch arm to the lower frame member;

FIG. 6 is an exploded perspective view of the hitch of the trailer of FIG. 1;

FIG. 8 is a plan view of the wheel connection of the stroller shown in FIG. 7.

DETAILED DESCRIPTION OF THE PRESENT INVENTION

Figure 1:
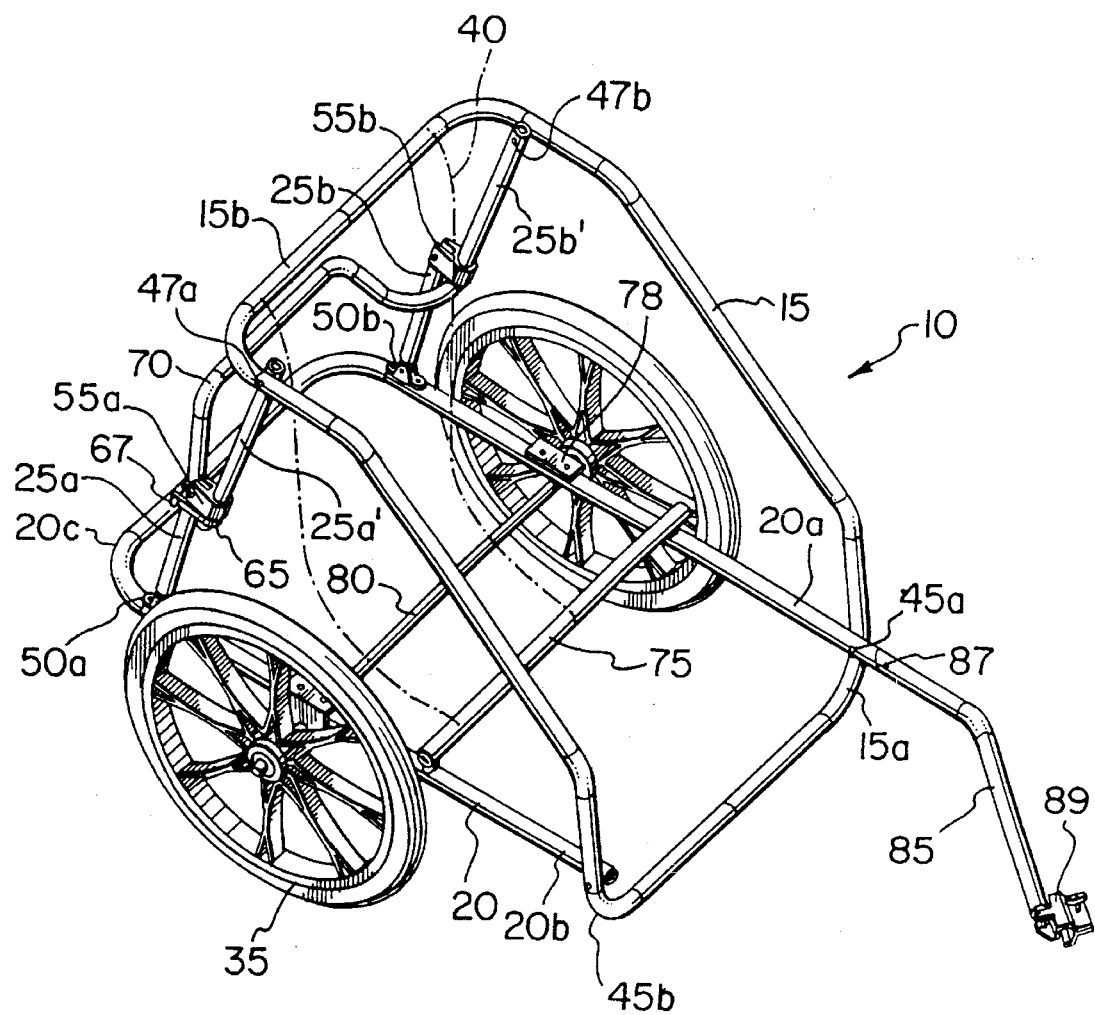
FIG. 1 is a perspective view of an embodiment of the folding trailer of the present invention.

As shown in FIG. 1, the trailer 10 of the present invention comprises an upper, continuous frame member 15, a lower frame member 20 and a pair of folding frame units 25a, 25b. The trailer further comprises wheels 35, or other displacement means such as skiis (not shown).

Upper frame member 15 is preferably substantially rectangular in plan view having a forward end 15a and a rear end 15b. The upper portion of the trailer's cargo compartment is defined by upper frame member 15. Lower frame member 20 is substantially U-shaped in plan view. The open arms 20a, 20b of the U-shaped, lower frame member 20 extend out forwardly of the rear end 20c. Lower frame member 20 defines the lower portion of the cargo compartment. A selected one of the arms (in this case 20a) extends out further than the other to allow for attachment of the hitch arm 85. Forward end 15a of upper frame member 15 is pivotally connected to arms 20a, 20b of lower frame member 20 as shown at 45a and 45b. Connections 45a, 45b allow the rotation of upper frame member 15 relative to lower frame member 20.

Folding frame units 25a, 25b are substantially identical, each having a first end and an opposite end. The first end of each folding frame unit 25a, 25b is pivotally connected adjacent rear end 15b of upper frame member 15, as shown at 47a and 47b. Each of the opposite ends of folding frame units 25a, 25b is pivotally attached adjacent rear end 20c of lower frame member 20, as shown at 50a and 50b. Folding frame units 25a, 25b, when extended, act to maintain rear end 15b of upper frame member 15 at a predetermined distance from rear end 20c of lower frame member 20, as shown in FIGS.1 and 2. This is the preferred operative position of the trailer.

Each folding frame unit 25a, 25b has two members pivotally connected at 55a and 55b. Connections 55a, 55b are positioned such that folding frame units 25a, 25b are foldable from the extended position to a collapsed position. As shown in FIG. 3, when folding frame unit 25a collapses, and folding frame unit 25b (not shown in FIG. 3) collapses in the same way, then pivotal connections 45, 47, 50 allow upper frame member 15 to rotate towards lower frame member 20.

Pivotal connections 45, 47, 50, 55 may be any suitable means such as screw or rivet. The connections should be durable, capable of repeated use and able to withstand stress. Pivotal connections 50a and 50b are preferably marine fittings, wherein raised journals extend from lower frame member 20 and are accommodated in jaws fitted onto folding frame units 25a, 25b. Pivotal connections 55a and 55b of the folding frame units 25a, 25b are preferably as shown enlarged in FIG. 4. Pivot point 55a, shown in FIG. 4, is positioned to define an upper member 25a' and a lower member 25a" on folding frame unit 25a. In the preferred embodiment, upper member 25a' is offset from lower member 25a" and pivot 55a takes the form of a marine fitting having a jaw 57 which accommodates a flattened portion 59 of lower member 25a". The flattened portion 59 is maintained in the jaw 57 by a pivotal pin 55a. Each folding frame unit 25a may have an extension 60 on a selected member (in this case 25a'), such that when the folding frame units are extended, extension 60 will come to bear on the adjacent member 25a" to prevent hyper extension at pivot 55a. A similar arrangement is used with respect to pivotal connection 55b. Still referring to FIG. 4, accidental collapse of the folding frame units 25a, 25b can be prevented by fitting a lock 65 at a selected one of pivotal connections 55a, 55b. Preferably, lock 65 is a U-shaped clip (as shown) adapted to fit around extension 60 and adjacent member 25a". Clip 65 is held in place by a releasable pin 67 such as a lynch pin. Clip 65 can, of course, be made integral with the jaw of the preferred pivotal connection 55a, if desired.

Referring back to FIG. 1, in a preferred embodiment the upper members 25a', 25b' of folding frame units 25a, 25b are joined by a cross bar 70. Cross bar 70 may be formed as a continuation of extensions 60. The cross bar 70 provides stability for the trailer and may further be formed into a handle (as shown) to aid in the collapsing procedure. Folding frame units 25a, 25b are biased outwardly, when the trailer is in the operative position, by the tension created by a fabric cover (not shown) which is retained as by being wrapped around and snap fastened in place over frame 15 on one side and which is stretched downwardly, around frame 20 on that side (with a suitable hole for axle 80) under bars 75 and 80, around frame 20 on the other side (again with a hole for axle 80), and is wrapped around and snap fastened over frame 15 on the other side. The fabric cover can suitably have a rear flap which snaps in place around bar 70, and is secured in front by being snap fastened around frame 15a. Besides tensioning units 25a and 25b outwards, the fabric cover prevents an occupant of the trailer from catching an arm or leg in the wheels 35.

The trailer may be further stabilized by extending a stabilizing bar 75 across open arms 20a, 20b of lower frame member 20.

To reduce the size of the folded trailer, lower frame member 20 is preferably narrower than upper frame member 15 such that upper frame member 15 fits over lower frame member 20 when the trailer is folded. Folding frame units 25a, 25b are positioned so as not to obstruct the rotation of upper frame member 15 during folding. Preferably, forward end 15a and rear end 15b of upper frame member 15 are angled downwardly, as is best seen in FIG. 2. This modification provides protection to cargo should the trailer tip during use and increases the size of the cargo compartment.

The frame members may be constructed of any suitable materials, for example tubing or solid rods, which provide adequate strength and durability. Preferably, the frame is constructed of aluminum tubing. Suitable tubing for the upper and lower frame members is 1" OD tubing with a 0.062" wall thickness while tubing of ⅞" OD is suitable for the folding frame units.

Displacement means 35 may be, as shown in FIG. 1, wheels. However, it is also envisioned that skiis may replace the wheels. Wheels 35 are supported on a common axle 80 which extends between journals 78 attached to lower frame member 20. The wheels may be provided with "quick release" fixtures to aid in their removal during the collapsing process. Quick release fixtures may be for example lynch pins.

A seat member 40, shown in phantom in FIG. 1, may be positioned in the trailer for carrying passengers. Alternatively, the seat member may be replaced by a floor (not shown) when the transport of cargo is desired. Seat member 40 is formed by securing a suitable material, such as for example fabric, to frame members. Preferably, the fabric will extend from rear end 15b of upper frame member 15 to have attachment at wheel journals 78 by means of grommets and be finally secured to stabilizing bar 75. Shock absorption for the seat can be provided by suitable shock absorption means, such as springs or rubber inserts, located between stabilizing bar 75 and lower frame member 20 or between the seat 40 and bar 75. The trailer of the present invention may be fitted with a protective rain shield as is known in the art.

Referring again to FIG. 1, in the preferred embodiment the trailer is adapted to be towed behind a bicycle (not shown). The trailer is hitched to a chain stay of the bicycle and, preferably, the left chain stay. A hitch arm 85 is attached to an extension of a selected arm (in this case 20*a*) of the lower frame member 20. The hitch arm connection is the site of much stress and preferably is adapted to withstand such stress. Referring to FIG. 5, preferably the hitch arm 85 is slotted into the lower frame member arm 20*a* by means of a inner reinforcement 86 adapted to be inserted between the end of arm 20*a* and the hitch arm 85. The inner reinforcement 86 is maintained in the arm 20*a* by aligning and cooperating with connection 45*a* while the inner reinforcement is maintained in the hitch arm 85 by a pin (not shown) which extends through aligned apertures 87 in the hitch arm 85 and reinforcement 86. To distribute the load at the connection over a greater area, the ends of arm 20*a* and hitch arm 85 are preferably made to mate in an angled arrangement as shown in FIG. 5. Hitch arm 85 is preferably formed from 1" aluminum tubing while the inner reinforcement is formed from ¾" cold rolled steel. A resilient hitch member 89 is attached at the end of hitch arm 85 for engagement with the chain stay.

Referring to FIG. 6, hitch member 89 comprises a collar arrangement 90 for pivotal connection to chain stay 100 (shown in phantom) and a clevis 95 for pivotal connection with hitch arm 85. Clevis 95 is preferably formed from sheet steel. Hitch arm 85 is maintained in clevis 95 by a bolt 97. In the preferred embodiment, a polyurethane adaptor 103 is inserted at the end of the hitch arm 85 and is held in the clevis 95 by bolt 97. The polyurethane adaptor 103 should be abrasion resistant, and it is formed that polyurethane of hardness 95 Shore A is suitable. The flexible properties of the polyurethane material of the adapter 103 allow increased flexibility at the clevis attachment as compared to the simple insertion of the rigid material of the hitch arm directly into the clevis. The flexibility of the adapter can be enhanced by forming a hollowed region in the adaptor where it is inserted into the hitch arm 85.

Collar arrangement 90 is comprised of a back collar segment 91 and a front collar segment 92. Front collar segment 91 and back collar segment 92 are adapted to encircle chain stay 100 when they are brought together. To maintain the collar segments 91, 92 in position on the chain stay 100, a bolt 105 is inserted through aligned apertures on the collar segments 91, 92. A knob 107 is threaded on bolt 105 adjacent the front collar segment 92 to allow manual adjustment of the collar segments about chain stay 100. It is preferred that the collar arrangement be formed from sheet steel such that collar segments 91, 92 take the form of plates which are bent to fit about chain stay 100. The clevis 95 is firmly connected to the collar arrangement 90 and preferably is formed from a tongue bent upward from front collar segment 92 which coacts with the rest of segment 92, as shown.

Figure 7:
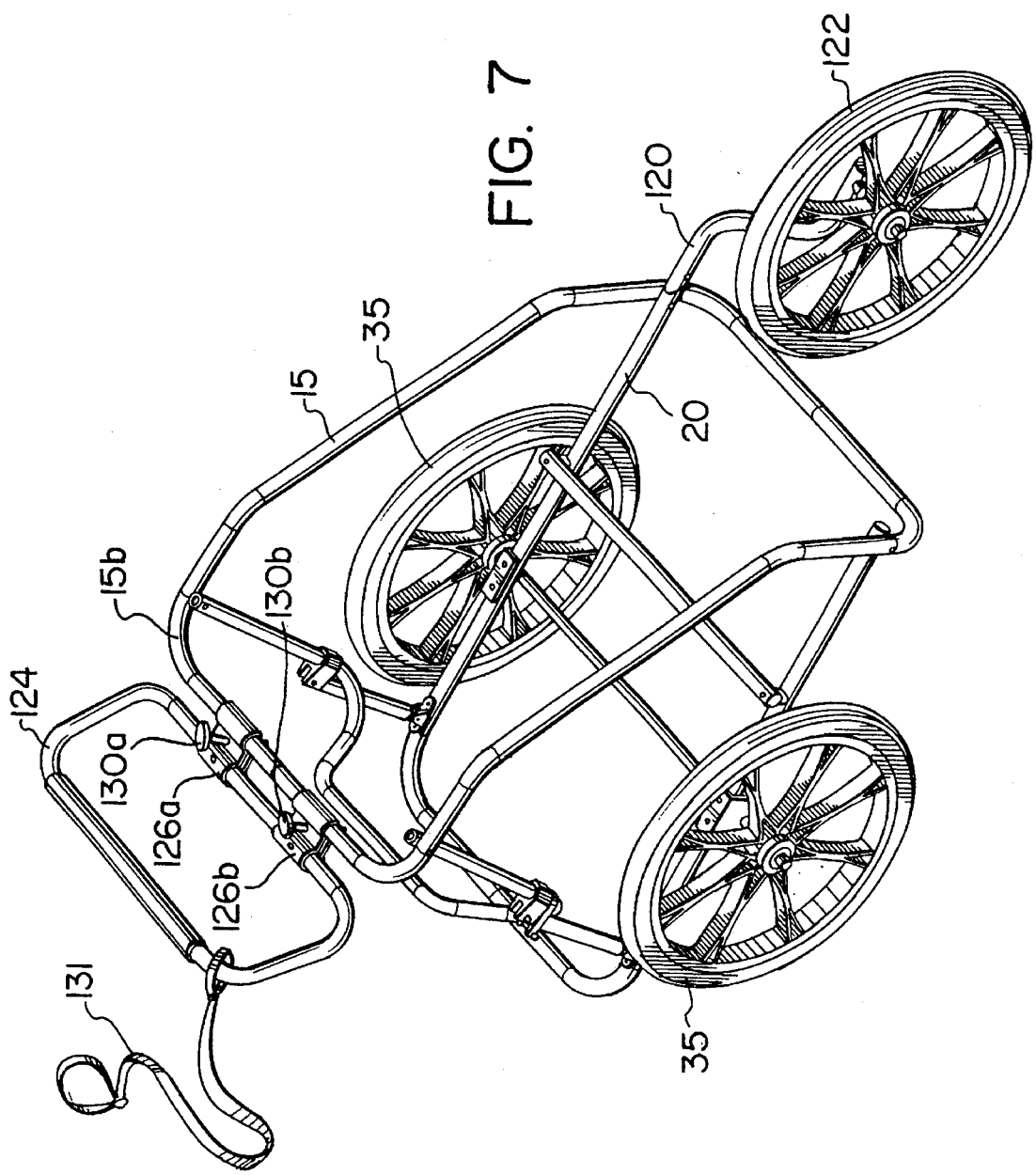
FIG. 7 is a perspective view of a stroller of the present invention.

Referring to FIG. 7, the trailer may be modified to form a stroller. To accomplish this, the previously described hitch arm is replaced with a wheel arm 120. Wheel arm 120 is attached to the extension of a selected arm of lower frame member 20 in a like manner to that previously described in regards to the hitch arm. To provide additional stability at the connection a clamp (not shown) can be positioned to surround the connection. Wheel arm 120 has releasably attached thereto a wheel 122 by means of for example a releasable lynch pin as will be shown in more detail in FIG. 8. To provide stability to the stroller, the wheel 122 is preferably of similar size to the pair of wheels 35 attached to the frame. A handle 124 is attached to rear end 15*b* of upper frame member 15 by means of clips 126*a*, 126*b*. Handle 124 is of suitable length to provide adequate apace for the stride of the person pushing the stroller. Clips 126*a*, 126*b* having adjustable knobs 130*a*, 130*b*, allow the handle 124 to be rotated and adjusted to various heights. When not in use the handle 124 may be rotated out of the way. To prevent accidental release of the stroller during use, a safety strap 131 formed of nylon of polyester webbing may be attached to the handle 124. The safety strap 131 is adapted to be fitted on the wrist of the user.

The wheel 122 is attached to the wheel arm 120 as shown in FIG. 8. A bolt 135 attaches an axle member 140 to the wheel arm 120. The wheel 122 is maintained on the axle 140 by means of a washer 145 and lynch pin 150 arrangement. a spring 155 is biased on the axle 140 and maintains the wheel 122 in position against the washer 145. An end cap 160 fits into the open end of the wheel arm 120.

It will be apparent that many other changes may be made to the illustrative embodiments, while falling within the scope of the invention and it is intended that all such changes be covered by the claims appended hereto.

I claim:

1. A folding trailer comprising:

an upper elongate frame member having a forward end and a rear end and defining an upper limit of a cargo compartment;

a lower frame member defining a lower limit of a cargo compartment and having a pair of side members extending from a rear end, the side members being pivotally connected to the upper frame member adjacent its forward end; and, a pair of folding frame units, each folding frame unit having a first end and a second end, the first end of each folding frame unit being pivotally connected adjacent the rear end of the upper portion and the opposite end of each folding frame unit being pivotally connected adjacent the rear end of the lower frame member, each folding frame unit having a pivot point such that the folding frame unit is foldable from an extended position to a collapsed position allowing the upper frame member to rotate towards the lower frame member and thereby fold the trailer into a compact position; and, a displacement means.

2. The folding trailer of claim 1 wherein the trailer further comprises a hitch arm extending forwardly from the lower frame member and a hitch member supported on the hitch arm for attachment to a vehicle.

3. The folding trailer of claim 2 wherein the displacement means are wheels.

4. A folding trailer comprising:

an upper elongate frame member having a forward end and a rear end and defining an upper limit of a cargo compartment;

a lower frame member having a forward end and a rear end and defining a lower limit of a cargo compartment, the lower frame member and the upper frame member being pivotally connected adjacent their forward ends; and, a pair of folding frame units, each folding frame unit having a first end and a second end, the first end of each folding frame unit being pivotally connected adjacent the rear end of the upper frame member and the opposite end of each folding frame unit being pivotally connected adjacent the rear end of the lower frame member, each folding frame unit having a pivot point such that the folding frame unit is foldable from an extended position to a collapsed position allowing the upper frame member to rotate towards the lower frame member and thereby fold the trailer into a compact position; and, a displacement means.

5. A folding trailer adapted for towing by a bicycle comprising:

an upper elongate frame member having a forward end and a rear end and defining an upper limit of a cargo compartment;

a lower frame member defining a lower limit of a cargo compartment and having a pair of side members extending from a rear end, the side members being pivotally connected to the upper frame member adjacent its forward end; and, a pair of folding frame units, each folding frame unit having a first end and a second end, the first end of each folding frame unit being pivotally connected adjacent the rear end of the upper portion and the opposite end of each folding frame unit being pivotally connected adjacent the rear end of the lower frame member, each folding frame unit having a pivot point such that the folding frame unit is foldable from an extended position to a collapsed position allowing the upper frame member to rotate towards the lower frame member and thereby fold the trailer into a compact position;

a hitch arm and a hitch member for attachment to the bicycle extending forwardly of the lower frame member; and, a plurality of wheels for supporting the frame.

6. The folding trailer of claim 5 wherein the upper and lower frame members, the hitch arm and the folding frame units are formed from aluminum tubing.

7. The folding trailer of claim 6 wherein the folding frame units are connected by a cross bar.

8. The folding trailer of claim 7 wherein at least one of the folding frame units is fitted with a lock in association with its pivot point to maintain the folding frame unit in an extended position.

9. The folding trailer of claim 5 wherein the upper frame member is substantially rectangular in plan view.

10. The folding trailer of claim 8 wherein the upper frame member is substantially rectangular in plan view.

11. The folding trailer of claim 10 wherein the forward portion and the rear portion of the upper frame member are angled downwardly.

12. The folding trailer of claim 5 wherein the hitch arm is attached at an extension of a selected side member of the lower frame member and a reinforcement adaptor is inserted between the extension and the hitch arm.

13. The folding trailer of claim 5 wherein the hitch member comprises a collar arrangement for pivotal attachment to a chain stay on the bicycle and a clevis for pivotal attachment to the hitch arm.

14. The folding trailer of claim 13 wherein the collar arrangement comprises a front collar segment and a back collar segment, such that the front and back collar segments are adapted to fit together to encircle the chain stay of the bicycle and to permit pivotal movement about the chain stay.

15. The folding trailer of claim 14 wherein the front collar segment and the back collar segment are maintained about the chain stay by a bolt extending through the front collar segment and back collar segment.

16. The folding trailer of claim 15 wherein the hitch arm further comprises a polyurethane adaptor between the hitch arm and the clevis of the hitch member.

* * * * *